United States Patent
Zhu

(10) Patent No.: US 11,879,206 B2
(45) Date of Patent: Jan. 23, 2024

(54) PREPARATION PROCESS OF SPUNLACE INTERTWINING TYPE RECYCLED COW LEATHER

(71) Applicant: Jiangyin Junhua Textile Technology Co., Ltd., Jiangyin (CN)

(72) Inventor: Xiaohua Zhu, Jiangyin (CN)

(73) Assignee: Jiangyin Junhua Textile Technology Co., Ltd., Jiangyin (CN)

( * ) Notice: Subject to any disclaimer, the term of this patent is extended or adjusted under 35 U.S.C. 154(b) by 317 days.

(21) Appl. No.: 17/278,347

(22) PCT Filed: May 31, 2019

(86) PCT No.: PCT/CN2019/089550
§ 371 (c)(1),
(2) Date: Mar. 22, 2021

(87) PCT Pub. No.: WO2020/199338
PCT Pub. Date: Oct. 8, 2020

(65) Prior Publication Data
US 2022/0034026 A1 Feb. 3, 2022

(30) Foreign Application Priority Data

Apr. 4, 2019 (CN) .......................... 201910270199.2

(51) Int. Cl.
*D06N 3/00* (2006.01)
*B32B 37/12* (2006.01)
(Continued)

(52) U.S. Cl.
CPC ....... *D06N 3/0018* (2013.01); *B32B 37/1284* (2013.01); *B32B 38/004* (2013.01);
(Continued)

(58) Field of Classification Search
CPC .. D06N 3/0018; D06N 3/0011; D06N 3/0013; D06N 3/0077; D06N 3/0088;
(Continued)

(56) References Cited

U.S. PATENT DOCUMENTS

| 7,731,814 B2 | 6/2010 | Bevan |
| 2003/0024092 A1* | 2/2003 | Orlandi ..................... B32B 5/26 442/385 |
| 2015/0292148 A1* | 10/2015 | Pourdeyhimi ......... D04H 1/492 28/112 |

FOREIGN PATENT DOCUMENTS

| CN | 101021031 A | 8/2007 |
| CN | 201512665 U | 6/2010 |

(Continued)

OTHER PUBLICATIONS

CN102660844A Machine Translation of Description (Year: 2023).*
(Continued)

*Primary Examiner* — Cynthia L Schaller
(74) *Attorney, Agent, or Firm* — Zhu Lehnhoff LLP

(57) ABSTRACT

A preparation process of spunlace intertwining type recycled cow leather comprises a material preparation process, a cow leather fiber web forming process, as well as a mixed fiber web forming process, an overlapped web forming process, a base fabric manufacturing process and a cow leather finished product manufacturing process which are sequentially arranged according to a preparation process flow; the base fabric manufacturing process comprises a buffing process, a single-side immersion treatment process and an ironing process which are sequentially arranged for manufacturing the overlapped web into the base fabric; and the single-side immersion treatment process comprises the steps of subjecting a single side of the base fabric to single-side coating treatment of the water-based PU material or the oil-based PU material by adopting an inverted feeding device and using a (Continued)

water-based PU material or an oil-based PU material as a coating so as to form a single-side permeable immersion layer of the base fabric.

3 Claims, 6 Drawing Sheets

(51) Int. Cl.
    *B32B 38/00*     (2006.01)
    *D06N 3/14*     (2006.01)

(52) U.S. Cl.
    CPC ......... *D06N 3/0011* (2013.01); *D06N 3/0013* (2013.01); *D06N 3/0077* (2013.01); *D06N 3/0088* (2013.01); *D06N 3/14* (2013.01); *B32B 2038/0064* (2013.01); *B32B 2375/00* (2013.01); *D06N 2201/06* (2013.01)

(58) Field of Classification Search
    CPC .. D06N 3/14; D06N 2201/06; D06N 2211/28; B32B 37/1284; B32B 38/004; B32B 2038/0064; B32B 2375/00; D04H 1/498; D04H 1/4258; D04H 1/4374; C09D 175/04; F26B 5/12; F26B 13/30
    See application file for complete search history.

(56) References Cited

FOREIGN PATENT DOCUMENTS

| | | | |
|---|---|---|---|
| CN | 102660844 A | * | 9/2012 |
| CN | 103397533 A | | 11/2013 |
| CN | 103757936 A | | 4/2014 |
| CN | 104275818 A | | 1/2015 |
| CN | 204112011 U | * | 1/2015 |
| CN | 204112056 U | | 1/2015 |
| CN | 105907901 A | | 8/2016 |
| CN | 105970657 A | | 9/2016 |
| CN | 106319985 A | | 1/2017 |
| CN | 108068426 A | | 5/2018 |
| CN | 108265396 A | | 7/2018 |
| WO | 2013056391 A1 | | 4/2013 |
| WO | 2014/099884 A1 | | 6/2014 |
| WO | 2016124251 A1 | | 8/2016 |

OTHER PUBLICATIONS

CN204112011U Machine Translation of Description (Year: 2023).*
Valmet Forward "Honeycomb(R) Thru-Air (R)M Thermal Bonding Systems," Valmet Inc., SER42182 VI EN Mar. 2014 (Year: 2014).*
Search Report, issued in CN201910270199.2, by China National IP Bureau, dated Apr. 4, 2019.
Written Opinion, issued in CN201910270199.2, by China National IP Bureau, dated Mar. 23, 2020.
Written Opinion, issued in CN201910270199.2, by China National IP Bureau, dated Sep. 18, 2020.
Ma Jianwei et al., "Introduction to Nonwoven Technology," Chapter 7, Apr. 2004, China.
Search Report, issued in EP19922874.3, by European Patent Office, dated Mar. 16, 2022.
International Search Report, issued in PCT/CN2019/089550, dated Dec. 31, 2019.
Written Opinion, issued in PCT/CN2019/089550, dated Dec. 31, 2019.

* cited by examiner

PREPARATION PROCESS OF SPUNLACE INTERTWINING TYPE RECYCLED COW LEATHER

TECHNICAL FIELD

The invention relates to the technical field of leather manufacturing, in particular to a preparation process of spunlace intertwining type recycled cow leather.

BACKGROUND ART

Leather is an indispensable commodity in human life, widely used in clothing, footwear, home, automobile, public services and many other fields. In the production process of leather products, a large amount of leftover bits and pieces of genuine leather are produced. If the left over bits and pieces of genuine leather can be recycled, especially by secondary processing into cow fiber leather, considerable wealth can be produced. Meanwhile, the invention has positive significance for green energy conservation and environmental protection.

The traditional reclaimed leather is characterized in that waste left over wastes of various leathers and animal skins are crushed into powder, and then the powder is bonded by adhesives or hot-melt fiber and pressed into a whole piece of reclaimed leather. The reclaimed leather has poor properties of moisture absorption, air permeability, hand feeling and the like, and has a large difference compared with the genuine leather.

To this end, the prior art has developed a collagen fiber reduced leather base fabric, which is a reduced leather base fabric prepared by extracting collagen fiber from left over wastes of various leathers and animal skins, and then passing the collagen fiber through a certain preparation process. The collagen fiber of the reduced leather base fabric has a three-dimensional web structure, and the performance is close to that of the genuine leather.

According to the prior art, the typical reduced leather base fabric is a water-based cow fiber leather base fabric manufactured by adopting a spunlace technology. By taking the cow fiber leather base fabric as a bottom layer, a PU film (polyurethane coating layer) simulating a cow leather effect is bonded on the surface of the bottom layer, so that the simulated cow leather can be manufactured to serve as a final leather product such as leather clothing, sofas, luggages, leather shoes and the like.

However, the simulated cow leather bonded by the cow fiber leather base fabric and the polyurethane coating generally has poor physical properties (such as low mechanical strength), poor hand feeling and lacking of genuine leather feeling, thereby affecting the quality of the simulated cow leather product. In addition, in the preparation process of the simulated cow leather, the energy consumption is large, so that the manufacturing cost is increased.

SUMMARY OF THE INVENTION

In order to solve the problems, the invention provides a preparation process of spunlace intertwining type recycled cow leather for improving the physical property and hand feeling of cow leather products, enhancing the leather feeling, reducing the energy consumption in the production process and achieving the purpose of green energy conservation. The specific technical scheme is as follows.

A preparation process of spunlace intertwining type recycled cow leather comprises a material preparation process, a cow leather fiber web forming process, as well as a mixed fiber web forming process, an overlapped web forming process, a base fabric manufacturing process and a cow leather finished product manufacturing process which are sequentially arranged according to a preparation process flow;

wherein the material preparation process comprises using a mixed fiber and a cow leather fiber as raw materials, and proportioning the same according to weight; and the mixed fiber is a mixed fiber selected from at least two of a regenerated fiber, a chemical fiber and the cow leather fiber;

the cow leather web-forming process comprises the step of preparing the cow leather fiber into a cow leather web by dry-forming or wet-forming;

the mixed fiber web forming process sequentially comprises a carding web forming process, a web lapping process and a spunlace preforming process of the mixed fiber;

the overlapped web forming process comprises overlapping the cow leather fiber web and the mixed fiber web to form an overlapped web, and sequentially arranging a spunlace intertwining process, a vacuum absorption-drying process and a circulation drying process after the overlapping process;

the base fabric manufacturing process comprises a buffing process, a single-side immersion treatment process and an ironing process which are sequentially arranged for manufacturing the overlapped web into the base fabric; the single-side immersion treatment process comprises the steps of subjecting a single side of the base fabric to single-side coating treatment of the water-based PU material or the oil-based PU material by adopting an inverted feeding device and using a water-based PU material or an oil-based PU material as a coating so as to form a single-side permeable immersion layer of the base fabric; and the cow leather finished product manufacturing process comprises a PU film pasting process for forming the front surface of the cow leather, a finishing treatment process for finishing the front surface of the cow leather and an oil return process for the back surface of the cow leather which are sequentially arranged.

According to the raw material proportioning of the preparation process, the cow leather comprises a cow leather fiber, and a mixed fiber selected from at least two of the regenerated fiber, the chemical fiber and the cow leather fiber, wherein the regenerated fiber can be extracted from a natural substance containing cellulose, and the cow leather fiber can be prepared from a large amount of leftover bits and pieces and excess materials of the genuine leather generated in the production process of the cow leather product. On one hand, it facilitates recycling of natural resources, and has good environmental protection; and on the other hand, by adding a certain proportion of chemical fiber into the mixed fiber ingredient, the physical properties (such as strength and the like) of the cow leather can be increased, so that the durability of leather products is improved.

Preferably, the chemical fiber can be a polyester fiber or a chinlon fiber, or a chemical fiber formed by the polyester fiber and the chinlon fiber according to a certain proportion.

Preferably, in carding the mixed fiber, the mixed fiber is carded into a web using a low-speed small-angle carding machine, with small damage to the fiber, high flatness, and good quality of the web forming.

In the preparation process of the invention, the cow leather fiber web is prepared by dry-forming or wet-forming, the dry-forming is air-laid, and the wet-forming is water-laid.

Among them, the air-laid can be adapted to the production of thicker cow leather, and the water-laid can be adapted to the production of thinner cow leather.

According to the preparation process disclosed by the invention, the mixed fiber is formed into a mixed fiber web by carding, web lapping, pre-needling and forming, the mixed fiber web superposed with the cow leather fiber web is subjected to spunlace intertwining, vacuum absorption-drying and circulation drying to form a superposed web, and the superposed web is subjected to ironing, grinding and single-side immersion treatment to form a cow fiber leather base fabric. The purpose of the immersion treatment is to permeate a single-side of the PU material to one side (the front side) where the base fabric and the PU film are combined so as to be firmly combined with the PU film subsequently. Meanwhile, in order not to affect the fur feeling of the back side of the cow leather, it is necessary to control the thickness of the single-side permeation layer.

Therefore, single-side feeding permeation is performed on the front surface of the cow fiber leather base fabric by an inverted feeding device, and the inverted feeding device has the following advantages: firstly, the penetrable permeation of the PU material can be prevented to affect the product performance; and secondly, the PU material with lower viscosity can be prepared to better realize the accurate control of the permeation layer depth.

Due to the permeation of the single-side PU material to the cow fiber leather base fabric, it facilitates that the high bonding strength of the base fabric and the PU film can be obtained after the PU film pasting on the subsequent base fabric.

Preferably, in the single-side immersion treatment process, the depth of the single-side immersion layer is ⅓ to ⅔ of the thickness of the base fabric.

The ratio of cow leather fiber, regenerated fiber and chemical fiber directly affects the material properties and hand feeling of cow leather.

As a preferable scheme of the material preparation process of the invention, in the material preparation process, the weight ratio of the mixed fiber to the cow leather fiber is 1:0.8-1:4; and the regenerated fiber in the mixed fiber account for 50% or more of the total weight of the mixed fiber.

More preferably, the regenerated fiber in the mixed fiber accounts for 50-80% of the total weight of the mixed fiber.

According to the invention, the regenerated fiber, the chemical fiber and the cow leather fiber are reasonably proportioned, so that the prepared cow leather has the appearance and hand feeling close to that of real cow leather, and also possesses high mechanical strength, achieving a good balance between the both.

As a preferred scheme of the lapping process of the invention, the web lapping process comprises the steps of cross lapping and straight lapping respectively by a lapping machine; and the cross lapping comprises the steps of warp-cross lapping and weft-cross lapping respectively.

According to the mixed fiber lapping by combination of the warp-cross lapping, the weft-cross lapping, and straight lapping, compared with the traditional single-direction cross lapping, the invention adopts three directions of the straight lapping, the warp-cross lapping and the weft-cross lapping to perform cross lapping, so that the arrangement direction of the mixed fiber can be further improved, and the complementation of physical properties in all directions can be realized. Therefore, the prepared cow fiber leather base fabric has good tensile strength and peeling strength in all directions, and the physical properties of cow leather products are improved.

In the invention, the spunlace preforming includes pre-wetting, pre-needling, and anti-pre-needling.

According to the invention, the spunlace intertwining type recycling process sequentially comprises low-pressure pre-needling, medium-pressure positive needling, high-pressure positive needling, high-pressure reverse needling and ultra-high-pressure stabbing.

The water pressure of the low-pressure pre-needling is 1-2 MPa, the water pressure of the medium-pressure positive needling is 4-5 MPa, the water pressure of the high-pressure positive needling is 8-10 MPa, the water pressure of the high-pressure reverse needling is 10-15 MPa, and the water pressure of the ultra-high-pressure stabbing is 15-32 MPa.

Compared with the conventional spunlace process, the embodiment has the advantages that the spunlace pressure of the low-pressure pre-needling, the medium-pressure positive needling and the high-pressure positive needling are optimally set for the spunlace of the overlapped web formed by overlapping the mixed fiber web and the cow leather fiber web. Meanwhile, an ultra-high-pressure needling of 15-32 MPa is added, so that the defect that the overlapped web with higher strength cannot be easily penetrated under the condition of normal-pressure spunlace is solved. After the overlapped web is subjected to progressive pressure spunlace, the connection structure of the internal fiber of the overlapped web is greatly improved, and the tensile strength and the peeling strength of the cow leather product are further improved.

In addition, low-pressure spunlace, medium-pressure spunlace, high-pressure spunlace and ultra-high-pressure spunlace are respectively adopted at different stages of leather product web-forming, so that on one hand, the web-forming quality can be improved to a maximum extent, and on the other hand, the service life of a spunlace core component can be prolonged.

As a further improvement, a negative pressure adsorber for enhancing the penetration effect of spunlace can be arranged below the overlapped web positioned at the high-pressure positive needling part, and the negative pressure adsorber is matched with the high-pressure needle, so that a larger pressure difference is formed between the upper surface and the lower surface of the overlapped web during the high-pressure positive needling, and the penetration effect is enhanced.

According to the invention, the vacuum absorption-drying process comprises the step of performing vacuum water-absorption on the overlapped web by a belt counter-compression vacuum water-absorption machine; the belt counter-compression vacuum water-absorption machine comprises an upper water-absorption device and a lower water-absorption device which are arranged in pair and an up-and-down mode; a vacuum box for sucking water is respectively arranged on the upper water-absorption device and the lower water-absorption device, an extrusion belt which rotates cyclically is arranged on a water-absorption plane of the vacuum box, and an extrusion gap used for the overlapped web to pass through is arranged between the extrusion belt on the upper water-absorption device and the extrusion belt on the lower water-absorption device; and a water-absorption hole communicated with a vacuum cavity inside the vacuum box is arranged on the water-absorption plane of the vacuum box, and the extrusion belt is a water-permeable extrusion belt.

According to the invention, the upper water-absorption device and the lower water-absorption device are fixed by a rack. The distance between the upper water-absorption device and the lower water-absorption device is adjustable by a sliding seat arranged on the rack and capable of moving up and down and an adjusting screw connected with the sliding seat (wherein the upper water-absorption device is connected on the sliding seat) so as to form different extrusion gaps.

In the vacuum absorption-drying process, the belt counter-compression type vacuum water-absorption machine has upper and lower vacuum cavities for absorbing water, the belt counter-compression type structure has a large water-absorption area, with the water-absorption efficiency greatly improved compared with the roll shaft extrusion or the conventional vacuum water-absorption mode in the prior art. Therefore, the electric power of subsequent drying can be greatly reduced, so that a good energy-saving effect is achieved. In addition, due to the fact that the belt counter-compression type vacuum water-absorption machine adopts plane counter-compression, the integral smoothness of the overlapped web can be effectively improved, and the final appearance quality of leather products is favorably improved.

According to the invention, the vacuum box is provided with a driving roller and a driven roller for realizing rotation of the extrusion belt, and a plurality of guide rollers are arranged between the driving roller and the driven roller.

The driving roller is driven by a speed reducing motor to rotate, and an upper driving roller and a lower driving roller rotate synchronously.

In the invention, the vacuum box is connected with a vacuum pump.

As a preferred scheme of the circulation drying process in the invention, the circulation drying process comprises the step of circularly drying the overlapped web by using an S-shaped drying device; the S-shaped drying device comprises a plurality of drying rollers which are distributed at different horizontal positions and different height positions, and the overlapped web is circularly dried in an S-shaped folding back and forwarding mode for a plurality of times along the drying rollers; the periphery of the drying roller is provided with a thermal insulation shell, and the top of the thermal insulation shell is provided with heat dissipation grid holes; and an air circulation pipe is arranged at two ends of the thermal insulation shell, and a circulation fan is arranged on the circulation pipe.

Preferably, the overlapped web enters and exits from the left direction and right directions, and the air circulation pipe is arranged in the front-back direction to form a better air flow effect.

According to the S-shaped drying device, the drying roller and the air circulation pipe are combined in a circulation drying mode; heat is concentrated around the overlapped web by the drying roller; heat loss is reduced by the thermal insulation shell; and air in the thermal insulation shell flows through the circulation fan to form a balanced heat dissipation effect, the drying efficiency is high, and the energy-saving effect is achieved. On the other hand, the drying device with the S-shaped structure is small in occupied area and beneficial to increasing the utilization rate of a factory building.

More preferably, the top of the thermal insulation shell is further provided with a grid hole opening degree linkage regulator for regulating the opening degree of heat dissipation grid holes, the opening degree of the heat dissipation grid hole is provided with a temperature sensor and a humidity sensor, and the opening degree of the heat dissipation grid hole is dynamically regulated by a control system connected with the grid hole opening degree linkage regulator according to data measured by the temperature sensor and the humidity sensor.

By means of the opening degree of the heat dissipation grid hole dynamically regulated according to data measured by the temperature sensor and the humidity sensor, on the one hand, the drying quality is guaranteed, and on the other hand, energy can be saved to a maximum extent.

As a preferred scheme of the inverted feeding device, the inverted feeding device comprises a guide wheel, a roller coating wheel and a roller coating tank which are sequentially arranged from top to bottom; wherein the roller coating tank contains a coating material, a lower end of the roller coating wheel is immersed in the coating material of the roller coating tank, and a gap for the base fabric to pass through during roll coating is arranged between the guide wheel and the roller coating wheel.

During roll coating, a combining face of the cow fiber leather base fabric with the PU film is arranged downwards, and subjected to single-side feeding permeation by a roller coating wheel arranged below the cow fiber leather base fabric. On the one hand, the inverted feeding device can prevent the penetrable permeation of the PU material to the cow fiber leather base fabric to affect product performance; and on the other hand, the PU material with lower viscosity can be prepared to better realize accurate control of the permeation layer depth.

Preferably, three groups of inverted feeding devices are arranged, and the base fabric sequentially enters the three groups of inverted feeding devices for coating during the roller coating.

Due to the arrangement of the three groups of inverted feeding devices, the cow fiber leather base fabric is favorably subjected to progressive roller coating, so that the permeation layer depth of the water-based PU material can be more accurately controlled.

According to the invention, the PU film pasting process comprises the step of pasting a PU film on the surface of a single-side immersion layer of the base fabric.

Preferably, the PU film is a transfer film.

According to the invention, the finishing treatment process comprises finishing the color or texture of the surface of the PU film by one or a combination of several ones of three-plate printing, spraying finish, lustring finish and buffing finish.

The appearance and the hand feeling of the cow leather product are further improved by the three-plate printing, the spraying finish, the lustring finish and the polishing finish.

According to the invention, the oil return treatment process comprises the steps of preparing oil return liquid, adopting an inverted feeding device, and performing single-side coating treatment on the back surface of the cow leather by using the oil return liquid as a coating; and the preparation process of the oil return liquid comprises the steps of adding 5-10 parts of leather softening oil, 5-10 parts of lanolin, 5-10 parts of penetrant and 0.3-0.5 part of mildew inhibitor into 100 parts of ionic water, and uniformly mixing the mixture to prepare the oil return liquid.

According to the formula of the oil return liquid, the softening oil has the functions of softening and lubricating fiber materials, the hand feeling of leather products can be further improved by adding the lanolin, and the synergistic effect of both can obviously improve the physical properties of the leather so as to further improve the quality of the leather products.

The invention has following beneficial effects.

Firstly, the invention provides a preparation process of spunlace intertwining type recycled cow leather. According to the raw material proportioning of the preparation process, the cow leather comprises a cow leather fiber, and a mixed fiber selected from at least two of the regenerated fiber, the chemical fiber and the cow leather fiber, wherein the regenerated fiber can be extracted from a natural substance containing cellulose, and the cow leather fiber can be prepared from a large amount of leftover bits and pieces and excess materials of the genuine leather generated in the production process of the cow leather product. On one hand, it facilitates recycling of natural resources, and has good environmental protection; and on the other hand, by adding a certain proportion of chemical fiber into the mixed fiber ingredient, the physical properties (such as strength and the like) of the cow leather can be increased, so that the durability of leather products is improved.

Secondly, the invention provides a preparation process of spunlace intertwining type recycled cow leather. Single-side feeding permeation is performed on the front surface of the cow fiber leather base fabric by an inverted feeding device, and the inverted feeding device has the following advantages: firstly, the penetrable permeation of the PU material can be prevented to affect the product performance; and secondly, the PU material with lower viscosity can be prepared to better realize the accurate control of the permeation layer depth.

Thirdly, the invention provides a preparation process of spunlace intertwining type recycled cow leather. The regenerated fiber, the chemical fiber and the cow leather fiber are reasonably proportioned, so that the prepared cow leather has the appearance and hand feeling close to that of real cow leather, and also possesses high mechanical strength, achieving a good balance between the both.

Fourthly, the invention provides a preparation process of spunlace intertwining type recycled cow leather. According to the mixed fiber lapping by combination of the warp-cross lapping, the weft-cross lapping, and straight lapping, compared with the traditional single-direction cross lapping, the invention adopts three directions of the straight lapping, the warp-cross lapping and the weft-cross lapping to perform cross lapping, so that the arrangement direction of the mixed fiber can be further improved, and the complementation of physical properties in all directions can be realized. Therefore, the prepared cow fiber leather base fabric has good tensile strength and peeling strength in all directions, and the physical properties of cow leather products are improved.

Fifthly, the invention provides a preparation process of spunlace intertwining type recycled cow leather. Compared with the conventional spunlace process, the invention has the advantages that the spunlace pressure of the low-pressure pre-needling, the medium-pressure positive needling and the high-pressure positive needling are optimally set for the spunlace of the overlapped web formed by overlapping the mixed fiber web and the cow leather fiber web. Meanwhile, an ultra-high-pressure needling of 15-32 MPa is added, so that the defect that the overlapped web with higher strength cannot be easily penetrated under the condition of normal-pressure spunlace is solved. After the overlapped web is subjected to progressive pressure spunlace, the connection structure of the internal fiber of the overlapped web is greatly improved, and the tensile strength and the peeling strength of the cow leather product are further improved. In addition, low-pressure spunlace, medium-pressure spunlace, high-pressure spunlace and ultra-high-pressure spunlace are respectively adopted at different stages of leather product web-forming, so that on one hand, the web-forming quality can be improved to a maximum extent, and on the other hand, the service life of a spunlace core component can be prolonged.

Sixthly, the invention provides a preparation process of spunlace intertwining type recycled cow leather. In the vacuum absorption-drying process, the belt counter-compression type vacuum water-absorption machine has upper and lower vacuum cavities for absorbing water, the belt counter-compression type structure has a large water-absorption area, with the water-absorption efficiency greatly improved compared with the roll shaft extrusion or the conventional vacuum water-absorption mode in the prior art. Therefore, the electric power of subsequent drying can be greatly reduced, so that a good energy-saving effect is achieved. In addition, due to the fact that the belt counter-compression type vacuum water-absorption machine adopts plane counter-compression, the integral smoothness of the overlapped web can be effectively improved, and the final appearance quality of leather products is favorably improved.

Seventhly, the invention provides a preparation process of spunlace intertwining type recycled cow leather. In the S-shaped drying device, the drying roller and the air circulation pipe are combined in a circulation drying mode; heat is concentrated around the overlapped web by the drying roller; heat loss is reduced by the thermal insulation shell; and air in the thermal insulation shell flows through the circulation fan to form a balanced heat dissipation effect, the drying efficiency is high, and the energy-saving effect is achieved. On the other hand, the drying device with the S-shaped structure is small in occupied area and beneficial to increasing the utilization rate of a factory building.

Eighthly, the invention provides a preparation process of spunlace intertwining type recycled cow leather. By means of the opening degree of the heat dissipation grid hole dynamically regulated according to data measured by the temperature sensor and the humidity sensor, on the one hand, the drying quality is guaranteed, and on the other hand, energy can be saved to a maximum extent.

Ninthly, the invention provides a preparation process of spunlace intertwining type recycled cow leather. Due to the arrangement of the three groups of inverted feeding devices, the cow fiber leather base fabric is favorably subjected to progressive roller coating, so that the permeation layer depth of the water-based PU material can be more accurately controlled.

Tenthly, the invention provides a preparation process of spunlace intertwining type recycled cow leather. The appearance and the hand feeling of the cow leather product are further improved by the three-plate printing, the spraying finish, the lustring finish and the polishing finish.

Eleventhly, the invention provides a preparation process of spunlace intertwining type recycled cow leather. According to the formula of the oil return liquid, the softening oil has the functions of softening and lubricating fiber materials, the hand feeling of leather products can be further improved by adding the lanolin, and the synergistic effect of both can obviously improve the physical properties of the leather so as to further improve the quality of the leather products.

Figure 1:
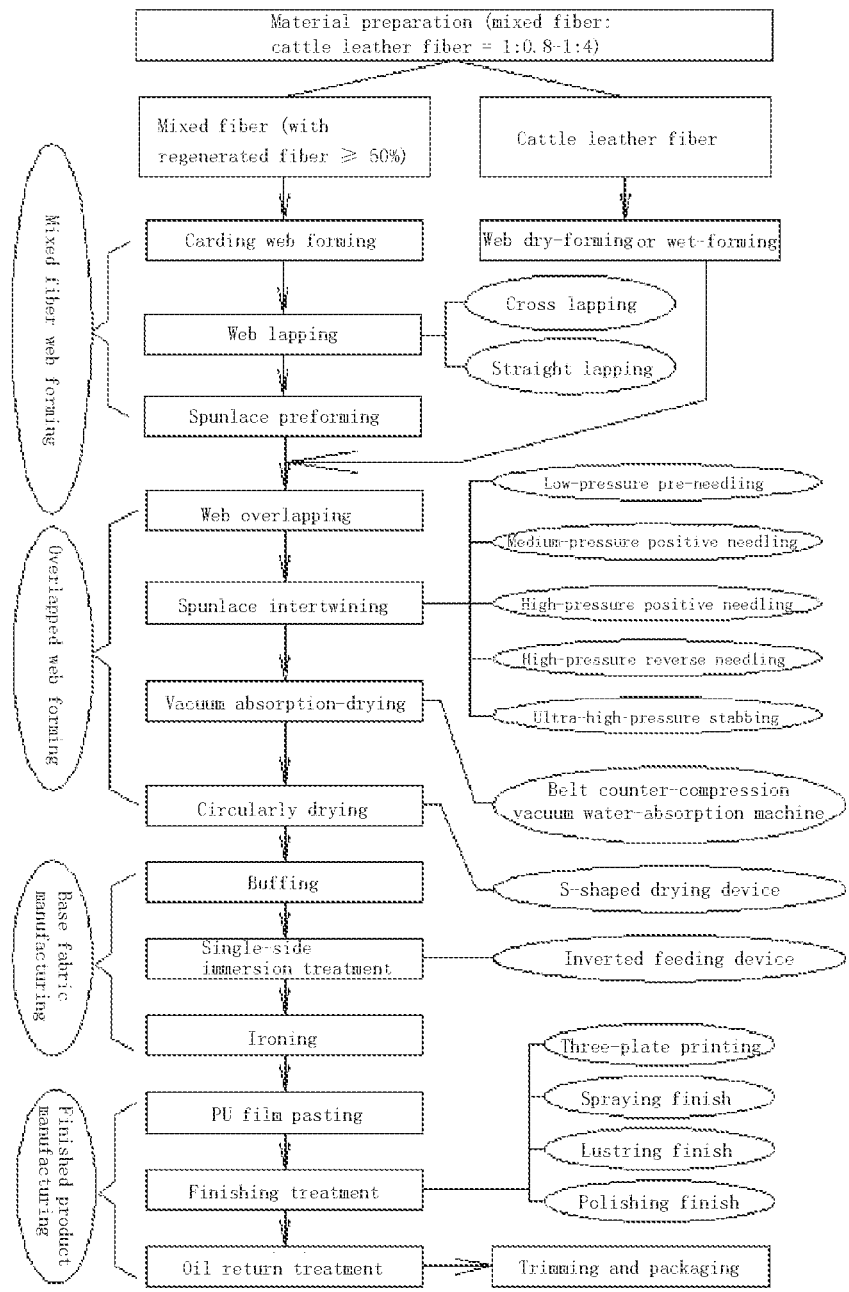
FIG. 1 is a process flow diagram of a preparation process of spunlace intertwining type recycled cow leather of the present invention.
Figure 2:
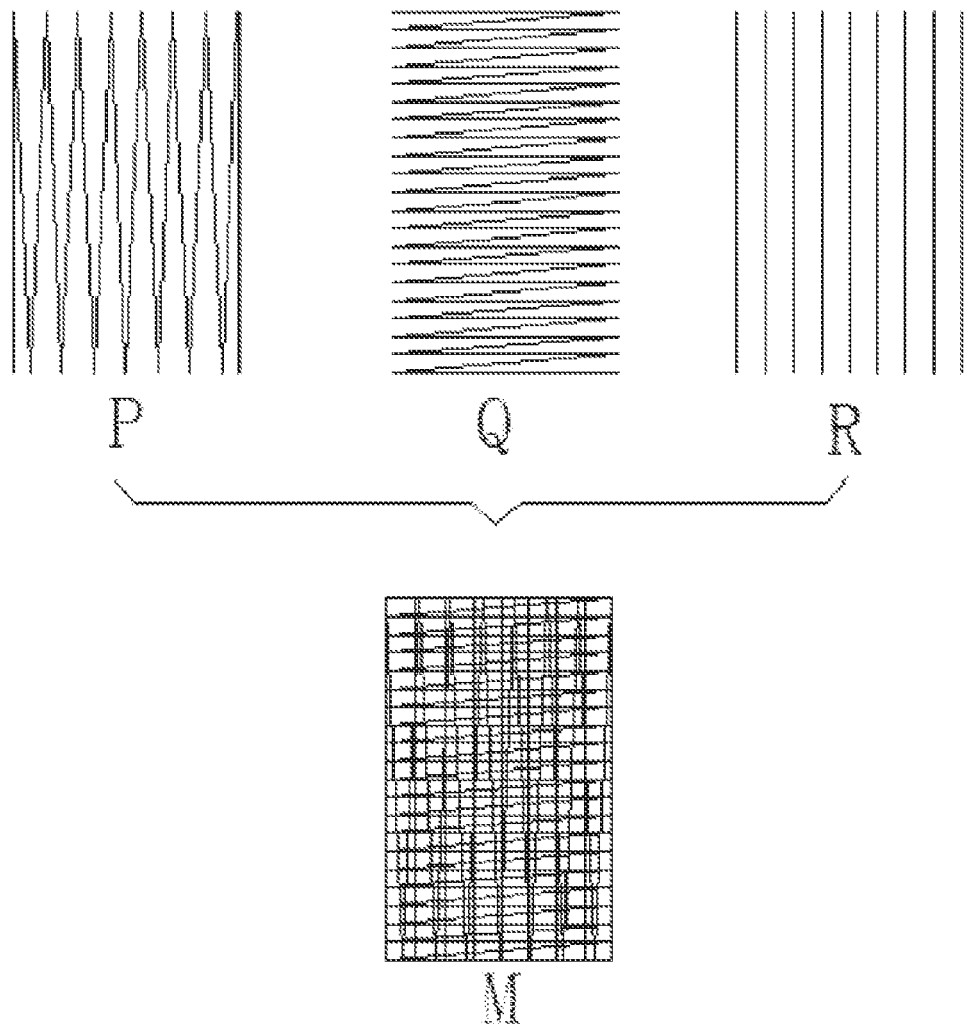
FIG. 2 is a schematic diagram of lapping webs.
Figure 3:
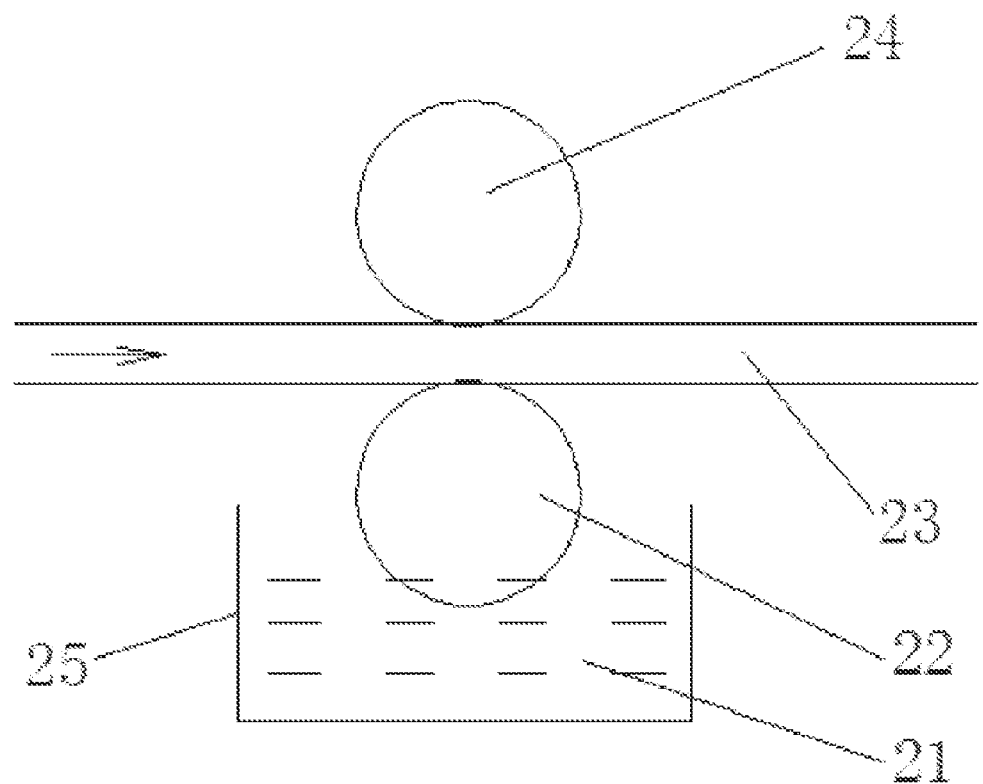
FIG. 3 is a structurally schematic view of an inverted feeding device.

In the drawings: 1, a belt counter-compression type vacuum water-absorption machine; 2, an overlapped web; 3, an upper water-absorption device; 4, a lower water-absorption device; 5, a vacuum box; 6, an extrusion belt; 7, a vacuum cavity; 8, a water-absorption hole; 9, a driving roller; 10, a driven roller; 11, a guide roller; and 12, a roller shaft support.

In the drawings: 21, coating; 22, a roller coating wheel; 23, cow fiber leather base fabric; 24, a guide wheel; and 25, a roller coating tank.

In the drawings: 32, a guide wheel; 33, a drying roller; 34, a thermal insulation shell; 35, heat dissipation grid holes; 36, a grid hole opening linkage regulator; 37, a temperature sensor; 38, a humidity sensor; 39, a circulation fan; and 40, a circulation pipe.

In the drawings: p is a warp-wise cross lapping web, Q is a weft-cross lapping web, R is a straight-lapping web, and M is a combined lapping web formed by the warp-cross lapping web, the weft-cross lapping web and the straight-lapping web.

In the drawings: A is a feeding end of an overlapped web on a belt counter-compression type vacuum water-absorption machine, and B is a discharging end of the overlapped web on the belt counter-compression type vacuum water-absorption machine.

DETAILED DESCRIPTION OF THE INVENTION

Reference will now be made in detail to the implementations of the present invention in combination with the accompanying drawings and embodiments below. The following embodiments are only intended to more clearly illustrate the technical solution of the present invention, and are not intended to limit the scope of the present invention.

Embodiment 1

As shown in FIGS. 1 to 6, an embodiment of a preparation process of spunlace intertwining type recycled cow leather of the invention comprises a material preparation process, a cow leather fiber web forming process, as well as a mixed fiber web forming process, an overlapped web forming process, a base fabric manufacturing process and a cow leather finished product manufacturing process which are sequentially arranged according to a preparation process flow;

wherein the material preparation process comprises using a mixed fiber and a cow leather fiber as raw materials, and proportioning the same according to weight; and the mixed fiber is a mixed fiber selected from at least two of a regenerated fiber, a chemical fiber and the cow leather fiber;

the cow leather web-forming process comprises the step of preparing the cow leather fiber into a cow leather web by dry-forming or wet-forming;

the mixed fiber web forming process sequentially comprises a carding web forming process, a web lapping process and a spunlace preforming process of the mixed fiber;

the overlapped web forming process comprises overlapping the cow leather fiber web and the mixed fiber web to form an overlapped web, and sequentially arranging a spunlace intertwining process, a vacuum absorption-drying process and a circulation drying process after the overlapping process;

the base fabric manufacturing process comprises a buffing process, a single-side immersion treatment process and an ironing process which are sequentially arranged for manufacturing the overlapped web into the base fabric;

the single-side immersion treatment process comprises the steps of subjecting a single side of the base fabric to single-side coating treatment of the water-based PU material or the oil-based PU material by adopting an inverted feeding device and using a water-based PU material or an oil-based PU material as a coating so as to form a single-side permeable immersion layer of the base fabric; and the cow leather finished product manufacturing process comprises a PU film pasting process for forming the front surface of the cow leather, a finishing treatment process for finishing the front surface of the cow leather and an oil return process for the back surface of the cow leather which are sequentially arranged.

According to the raw material proportioning of the preparation process, the cow leather comprises a cow leather fiber, and a mixed fiber selected from at least two of the regenerated fiber, the chemical fiber and the cow leather fiber, wherein the regenerated fiber can be extracted from a natural substance containing cellulose, and the cow leather fiber can be prepared from a large amount of leftover bits and pieces and excess materials of the genuine leather generated in the production process of the cow leather product. On one hand, it facilitates recycling of natural resources, and has good environmental protection; and on the other hand, by adding a certain proportion of chemical fiber into the mixed fiber ingredient, the physical properties (such as strength and the like) of the cow leather can be increased, so that the durability of leather products is improved.

Preferably, the chemical fiber can be a polyester fiber or a chinlon fiber, or a chemical fiber formed by the polyester fiber and the chinlon fiber according to a certain proportion.

Preferably, in carding the mixed fiber, the mixed fiber is carded into a web using a low-speed small-angle carding machine, with small damage to the fiber, high flatness, and good quality of the web forming.

In the preparation process of the embodiment, the cow leather fiber web is prepared by dry-forming or wet-forming, the dry-forming is air-laid, and the wet-forming is water-laid.

Among them, the air-laid can be adapted to the production of thicker cow leather, and the water-laid can be adapted to the production of thinner cow leather.

According to the preparation process disclosed by the embodiment, the mixed fiber is formed into a mixed fiber web by carding, web lapping, pre-needling and forming, the mixed fiber web superposed with the cow leather fiber web is subjected to spunlace intertwining, vacuum absorption-drying and circulation drying to form a superposed web, and the superposed web is subjected to ironing, grinding and single-side immersion treatment to form a cow fiber leather base fabric. The purpose of the immersion treatment is to permeate a single-side of the PU material to one side (the front side) where the base fabric and the PU film are combined so as to be firmly combined with the PU film subsequently. Meanwhile, in order not to affect the fur feeling of the back side of the cow leather, it is necessary to control the thickness of the single-side permeation layer.

Therefore, single-side feeding permeation is performed on the front surface of the cow fiber leather base fabric by an inverted feeding device, and the inverted feeding device has the following advantages: firstly, the penetrable permeation of the PU material can be prevented to affect the product performance; and secondly, the PU material with lower viscosity can be prepared to better realize the accurate control of the permeation layer depth.

Due to the permeation of the single-side PU material to the cow fiber leather base fabric, it facilitates that the high bonding strength of the base fabric and the PU film can be obtained after the PU film pasting on the subsequent base fabric.

Preferably, in the single-side immersion treatment process, the depth of the single-side immersion layer is ⅓ to ⅔ of the thickness of the base fabric.

The ratio of cow leather fiber, regenerated fiber and chemical fiber directly affects the material properties and hand feeling of cow leather.

As a preferable scheme of the material preparation process of the embodiment, in the material preparation process, the weight ratio of the mixed fiber to the cow leather fiber is 1:0.8-1:4; and the regenerated fiber in the mixed fiber account for 50% or more of the total weight of the mixed fiber.

More preferably, the regenerated fiber in the mixed fiber accounts for 50-80% of the total weight of the mixed fiber.

According to the invention, the regenerated fiber, the chemical fiber and the cow leather fiber are reasonably proportioned, so that the prepared cow leather has the appearance and hand feeling close to that of real cow leather, and also possesses high mechanical strength, achieving a good balance between the both.

As a preferred scheme of the lapping process of the embodiment, the web lapping process comprises the steps of cross lapping and straight lapping respectively by a lapping machine; and the cross lapping comprises the steps of warp-cross lapping and weft-cross lapping respectively.

According to the mixed fiber lapping by combination of the warp-cross lapping, the weft-cross lapping, and straight lapping, compared with the traditional single-direction cross lapping, the embodiment of the invention adopts three directions of the straight lapping, the warp-cross lapping and the weft-cross lapping to perform cross lapping, so that the arrangement direction of the mixed fiber can be further improved, and the complementation of physical properties in all directions can be realized. Therefore, the prepared cow fiber leather base fabric has good tensile strength and peeling strength in all directions, and the physical properties of cow leather products are improved.

In this embodiment, the spunlace preforming includes pre-wetting, pre-needling, and anti-pre-needling.

In the embodiment, the spunlace intertwining process sequentially comprises low-pressure pre-needling, medium-pressure positive needling, high-pressure positive needling, high-pressure reverse needling and ultra-high-pressure stabbing.

The water pressure of the low-pressure pre-needling is 1-2 MPa, the water pressure of the medium-pressure positive needling is 4-5 MPa, the water pressure of the high-pressure positive needling is 8-10 MPa, the water pressure of the high-pressure reverse needling is 10-15 MPa, and the water pressure of the ultra-high-pressure stabbing is 15-32 MPa.

Compared with the conventional spunlace process, the embodiment has the advantages that the spunlace pressure of the low-pressure pre-needling, the medium-pressure positive needling and the high-pressure positive needling are optimally set for the spunlace of the overlapped web formed by overlapping the mixed fiber web and the cow leather fiber web. Meanwhile, an ultra-high-pressure needling of 15-32 MPa is added, so that the defect that the overlapped web with higher strength cannot be easily penetrated under the condition of normal-pressure spunlace is solved. After the overlapped web is subjected to progressive pressure spunlace, the connection structure of the internal fiber of the overlapped web is greatly improved, and the tensile strength and the peeling strength of the cow leather product are further improved.

In addition, low-pressure spunlace, medium-pressure spunlace, high-pressure spunlace and ultra-high-pressure spunlace are respectively adopted at different stages of leather product web-forming, so that on one hand, the web-forming quality can be improved to a maximum extent, and on the other hand, the service life of a spunlace core component can be prolonged.

As a further improvement, a negative pressure adsorber for enhancing the penetration effect of spunlace can be arranged below the overlapped web positioned at the high-pressure positive needling part, and the negative pressure adsorber is matched with the high-pressure needle, so that a larger pressure difference is formed between the upper surface and the lower surface of the overlapped web during the high-pressure positive needling, and the penetration effect is enhanced.

In the embodiment, the vacuum absorption-drying process comprises the step of performing vacuum water-absorption on the overlapped web by a belt counter-compression vacuum water-absorption machine 1; the belt counter-compression vacuum water-absorption machine 1 comprises an upper water-absorption device 3 and a lower water-absorption device 4 which are arranged in pair and an up-and-down mode; a vacuum box 5 for sucking water is respectively arranged on the upper water-absorption device 3 and the lower water-absorption device 4, an extrusion belt 6 which rotates cyclically is arranged on a water-absorption plane of the vacuum box 5, and an extrusion gap used for the overlapped web 2 to pass through is arranged between the extrusion belt 6 on the upper water-absorption device 3 and the extrusion belt 6 on the lower water-absorption device 4; and a water-absorption hole 8 communicated with a vacuum cavity 7 inside the vacuum box 5 is arranged on the water-absorption plane of the vacuum box 5, and the extrusion belt 6 is a water-permeable extrusion belt.

The upper water-absorption device 3 and the lower water-absorption device 4 in this embodiment are fixed by a rack. The distance between the upper water-absorption device 3 and the lower water-absorption device 4 is adjustable by a sliding seat arranged on the rack and capable of moving up and down and an adjusting screw connected with the sliding seat (wherein the upper water-absorption device 3 is connected on the sliding seat) so as to form different extrusion gaps.

In the vacuum absorption-drying process, the belt counter-compression type vacuum water-absorption machine 1 has upper and lower vacuum cavities 7 for absorbing water, the belt counter-compression type structure has a large water-absorption area, with the water-absorption efficiency greatly improved compared with the roll shaft extrusion or the conventional vacuum water-absorption mode in the prior art. Therefore, the electric power of subsequent drying can be greatly reduced, so that a good energy-saving effect is achieved. In addition, due to the fact that the belt counter-compression type vacuum water-absorption machine 1 adopts plane counter-compression, the integral smoothness of the overlapped web 2 can be effectively improved, and the final appearance quality of leather products is favorably improved.

In this embodiment, the vacuum box 5 is provided with a driving roller 9 and a driven roller 10 realizing rotation of the extrusion belt 6, and a plurality of guide rollers 11 are arranged between the driving roller 9 and the driven roller 10.

The driving roller 9 is driven by a speed reducing motor to rotate, and an upper driving roller and a lower driving roller rotate synchronously.

In this embodiment, the vacuum tank 5 is connected with a vacuum pump.

As a preferred scheme of the circulation drying process in the invention, the circulation drying process comprises the step of circularly drying the overlapped web 2 by using an S-shaped drying device; the S-shaped drying device comprises a plurality of drying rollers 33 which are distributed at different horizontal positions and different height positions, and the overlapped web 2 is circularly dried in an S-shaped folding back and forwarding mode for a plurality of times along the drying rollers 33; the periphery of the drying roller 33 is provided with a thermal insulation shell 34, and the top of the thermal insulation shell 34 is provided with heat dissipation grid holes 35; and an air circulation pipe is arranged at two ends of the thermal insulation shell 34, and a circulation fan 39 is arranged on the circulation pipe 40.

Figure 4:
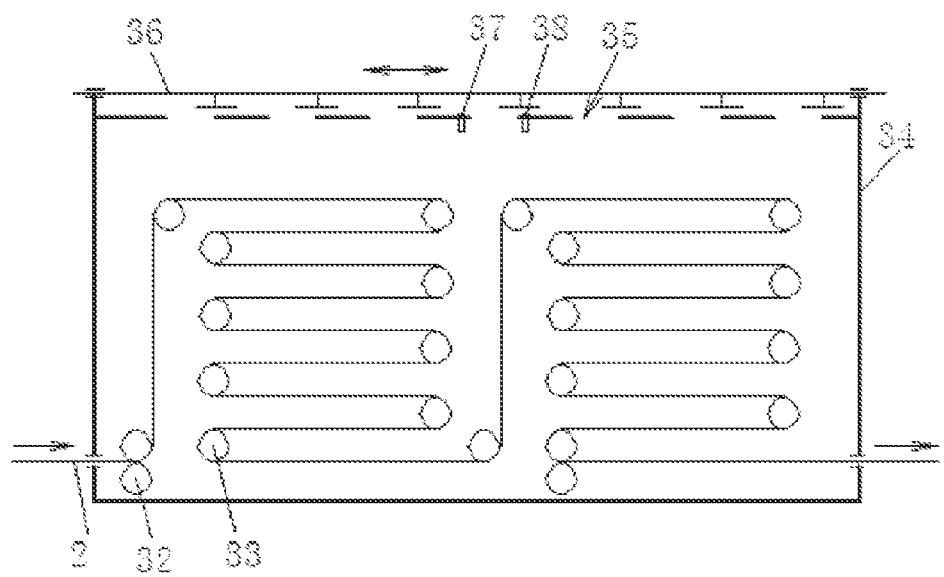
FIG. 4 is a structurally schematic view of an S-shaped drying device.
Figure 5:
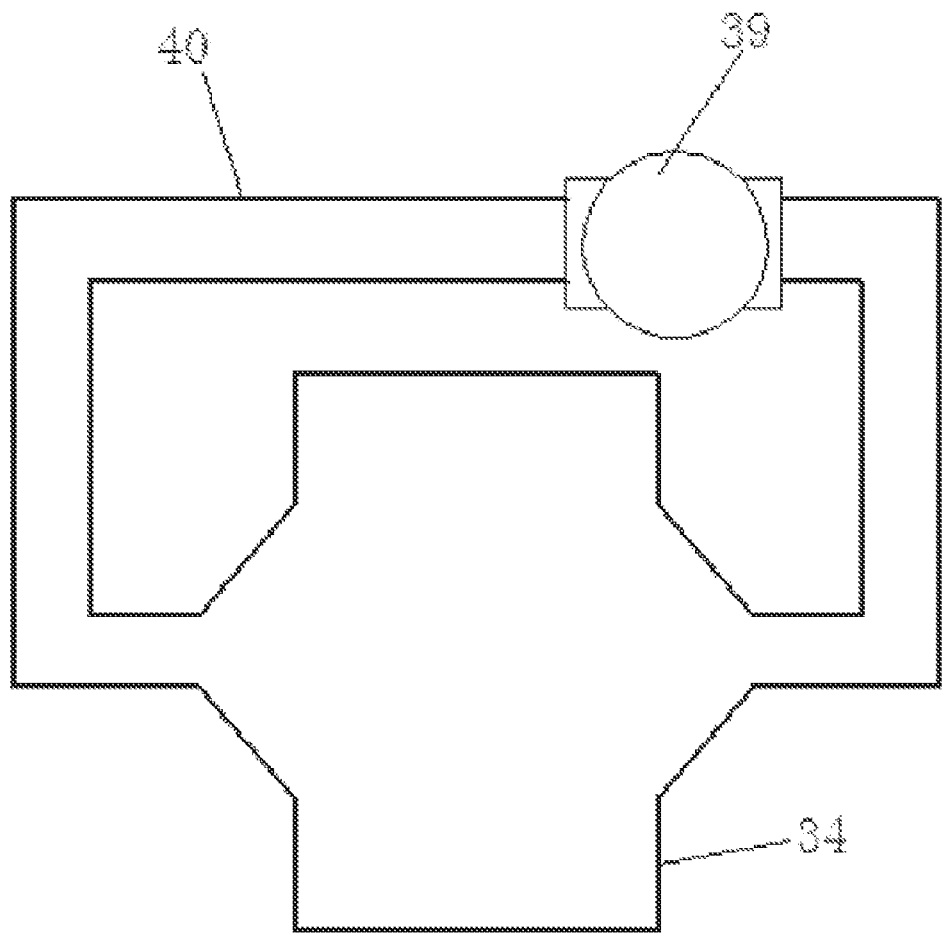
FIG. 5 is a structurally schematic view (left side view) in which a circulation pipe and a circulation fan are provided on a thermal insulation shell of FIG. 4.
Figure 6:
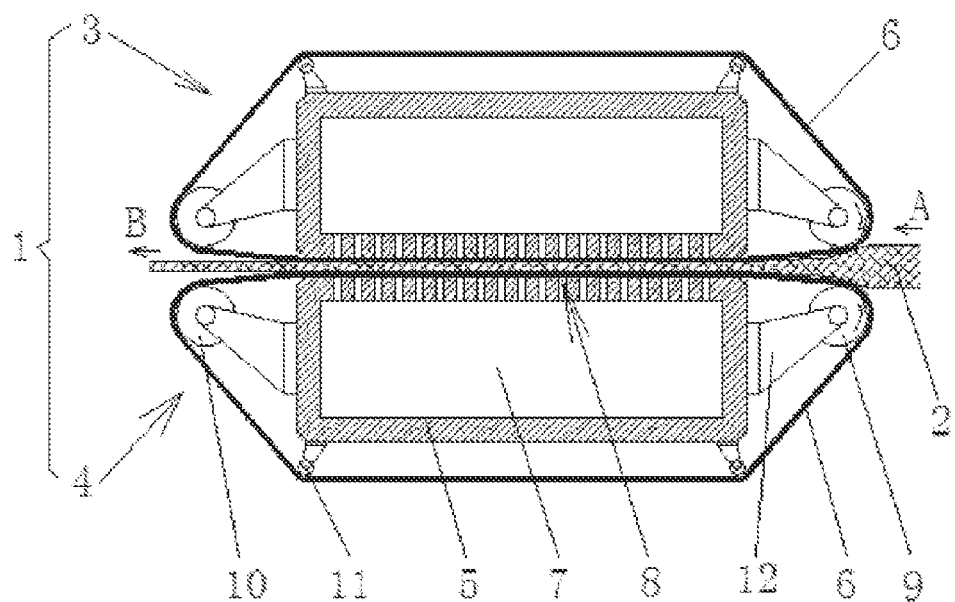
FIG. 6 is a structurally schematic view of a belt counter-compression vacuum water-absorption machine.

In FIGS. 4 and 5, the overlapped web 2 enters and exits from the left and right directions, and the air circulation pipe 40 is arranged in the front-back direction to form a better air flow effect.

According to the S-shaped drying device, the drying roller 33 and the air circulation pipe are combined in a circulation drying mode, heat is concentrated around the overlapped web by the drying roller 33; heat loss is reduced by the thermal insulation shell 34; and air in the thermal insulation shell 34 flows through the circulation fan 39 to form a balanced heat dissipation effect, the drying efficiency is high, and the energy-saving effect is achieved. On the other hand, the drying device with the S-shaped structure is small in occupied area and beneficial to increasing the utilization rate of a factory building.

More preferably, the top of the thermal insulation shell 34 is further provided with a grill hole opening degree linkage regulator 36 for regulating the opening degree of the heat dissipation grill holes 35, the opening degree of the heat dissipation grill hole 35 is provided with a temperature sensor 37 and a humidity sensor 38, and the opening degree of the heat dissipation grill hole 35 is dynamically regulated by a control system connected with the grill hole opening degree linkage regulator 36 according to data measured by the temperature sensor 37 and the humidity sensor 38.

By means of the opening degree of the heat dissipation grid hole dynamically regulated according to data measured by the temperature sensor 37 and the humidity sensor 38, on the one hand, the drying quality is guaranteed, and on the other hand, energy can be saved to a maximum extent.

As a preferable scheme of the inverted feeding device in this embodiment, the inverted feeding device comprises a guide wheel 24, a roller coating wheel 22, and a roller coating tank 25 which are sequentially arranged from top to bottom; wherein the roller coating tank 25 contains a coating material, a lower end of the roller coating wheel 22 is immersed in the coating material 21 of the roller coating tank 25, and a gap for the base fabric 23 to pass through during roll coating is provided between the guide wheel 24 and the roller coating wheel 22.

During roll coating, a combining face of the cow fiber leather base fabric 23 with the PU film is arranged downwards, and subjected to single-side feeding permeation by a roller coating wheel 22 arranged below the cow fiber leather base fabric 23. On the one hand, the inverted feeding device can prevent the penetrable permeation of the PU material to the cow fiber leather base fabric 23 to affect product performance; and on the other hand, the PU material with lower viscosity can be prepared to better realize accurate control of the permeation layer depth.

Preferably, three groups of inverted feeding devices are arranged, and the base fabric sequentially enters the three groups of inverted feeding devices for coating during the roller coating.

Due to the arrangement of the three groups of inverted feeding devices, the cow fiber leather base fabric is favorably subjected to progressive roller coating, so that the permeation layer depth of the water-based PU material can be more accurately controlled.

In the embodiment, the PU film pasting process comprises the step of pasting a PU film on the surface of a single-side immersion layer of the base fabric.

Preferably, the PU film is a transfer film.

According to the invention, the finishing treatment process comprises finishing the color or texture of the surface of the PU film by one or a combination of several ones of three-plate printing, spraying finish, lustring finish and polishing finish.

The appearance and the hand feeling of the cow leather product are further improved by the three-plate printing, the spraying finish, the lustring finish and the polishing finish.

According to the embodiment, the oil return treatment process comprises the steps of preparing oil return liquid, adopting an inverted feeding device, and performing single-side coating treatment on the back surface of the cow leather by using the oil return liquid as a coating; and the preparation process of the oil return liquid comprises the steps of adding 5-10 parts of leather softening oil, 5-10 parts of lanolin, 5-10 parts of penetrant and 0.3-0.5 part of mildew inhibitor into 100 parts of ionic water, and uniformly mixing the mixture to prepare the oil return liquid.

According to the formula of the oil return liquid, the softening oil has the functions of softening and lubricating fiber materials, the hand feeling of leather products can be further improved by adding the lanolin, and the synergistic effect of both can obviously improve the physical properties of the leather so as to further improve the quality of the leather products.

Embodiment 2

According to the preparation process of Embodiment 1 for the manufacture of the spunlace intertwining type recycled cow leather, and in the material preparation process, the weight ratio of the mixed fiber to the cow leather fiber is set to be 1:4, the content of the cow leather fiber in the mixed fiber is set to be 45%, and the prepared cow leather fiber has a total content of $(1\times45\%+4)/(1+4)\times$

Embodiment 3

According to the preparation process of Embodiment 1 for the manufacture of the spunlace intertwining type recycled cow leather, and in the material preparation process, the weight ratio of the mixed fiber to the cow leather fiber is set to be 1:3, the content of the cow leather fiber in the mixed fiber is set to be 40%, and the prepared cow leather fiber has a total content of $(1\times40\%+3)/(1+3)\times 100\%=85\%$ in the cow leather; and the cow leather is used for manufacturing sofas and bags.

Embodiment 4

According to the preparation process of Embodiment 1 for the manufacture of the spunlace intertwining type recycled cow leather, and in the material preparation process, the weight ratio of the mixed fiber to the cow leather fiber is set to be 1:2.8, the content of the cow leather fiber in the mixed fiber is set to be 40%, and the prepared cow leather fiber has a total content of $(1\times40\%+2.8)/(1+2.8)\times 100\%=84.2\%$ in the cow leather; and the cow leather is used for manufacturing sofas and bags.

Embodiment 5

According to the preparation process of Embodiment 1 for the manufacture of the spunlace intertwining type recycled cow leather, and in the material preparation process, the weight ratio of the mixed fiber to the cow leather fiber is set to be 1:2, the content of the cow leather fiber in the mixed fiber is set to be 25%, and the prepared cow leather fiber has a total content of $(1\times25\%+2)/(1++2)\times 100\%=75\%$ in the cow leather; and the cow leather is used for manufacturing sofas and bags.

The mentioned above is only preferred embodiments of the invention. It should be noted that several modifications and adaptations may be made by those skilled in the art without departing from the technical principles of the present invention, and such modifications and adaptations are to be considered within the scope of the invention.

The invention claimed is:

1. A preparation process of spunlace intertwining type recycled cow leather, comprising a material preparation process, a cow leather fiber web forming process, a mixed fiber web forming process, an overlapped web forming process, a base fabric manufacturing process and a cow leather finished product manufacturing process, which are sequentially performed according to a preparation process flow;

wherein the material preparation process comprises using a mixed fiber and a cow leather fiber as raw materials, and proportioning the same according to weight; and the mixed fiber is a mixed fiber selected from at least two of a regenerated fiber, a chemical fiber and the cow leather fiber;

wherein the cow leather web-forming process comprises preparing the cow leather fiber into a cow leather web by dry-forming or wet-forming;

wherein the mixed fiber web forming process sequentially comprises a carding web forming process, a web lapping process and a spunlace preforming process of the mixed fiber;

wherein the overlapped web forming process comprises overlapping the cow leather fiber web and the mixed fiber web to form an overlapped web, and sequentially performing a spunlace intertwining process, a vacuum absorption-drying process and a circulation drying process after the overlapping process;

wherein the base fabric manufacturing process comprises a buffing process, a single-side immersion treatment process and an ironing process which are sequentially performed to transform the overlapped web into the base fabric; the single-side immersion treatment process comprises coating a single side of the base fabric with a water-based PU material or an oil-based PU material by using an inverted feeding device so as to form a single-side permeable immersion layer of the base fabric;

wherein the cow leather finished product manufacturing process comprises a PU film pasting process for forming a front surface of the base fabric, a finishing treatment process for finishing the front surface of the base fabric and an oil return treatment process for a back surface of the base fabric, which are sequentially performed; and wherein in the single-side immersion treatment process, a depth of the single-side immersion layer is ⅓ to ⅔ of a thickness of the base fabric; in the material preparation process, a weight ratio of the mixed fiber to the cow leather fiber is 1:0.8-1:4; and the regenerated fiber in the mixed fiber account for 50% or more of a total weight of the mixed fiber.

2. A preparation process of spunlace intertwining type recycled cow leather, comprising a material preparation process, a cow leather fiber web forming process, a mixed fiber web forming process, an overlapped web forming process, a base fabric manufacturing process and a cow leather finished product manufacturing process, which are sequentially performed according to a preparation process flow;

wherein the material preparation process comprises using a mixed fiber and a cow leather fiber as raw materials, and proportioning the same according to weight; and the mixed fiber is a mixed fiber selected from at least two of a regenerated fiber, a chemical fiber and the cow leather fiber;

wherein the cow leather web-forming process comprises preparing the cow leather fiber into a cow leather web by dry-forming or wet-forming;

wherein the mixed fiber web forming process sequentially comprises a carding web forming process, a web lapping process and a spunlace preforming process of the mixed fiber;

wherein the overlapped web forming process comprises overlapping the cow leather fiber web and the mixed fiber web to form an overlapped web, and sequentially performing a spunlace intertwining process, a vacuum absorption-drying process and a circulation drying process after the overlapping process;

wherein the base fabric manufacturing process comprises a buffing process, a single-side immersion treatment process and an ironing process which are sequentially performed to transform the overlapped web into the base fabric; the single-side immersion treatment process comprises coating a single side of the base fabric with a water-based PU material or an oil-based PU material by using an inverted feeding device so as to form a single-side permeable immersion layer of the base fabric;

wherein the cow leather finished product manufacturing process comprises a PU film pasting process for forming a front surface of the base fabric, a finishing treatment process for finishing the front surface of the base fabric and an oil return treatment process for a back surface of the base fabric, which are sequentially performed; and wherein the spunlace intertwining type recycling process sequentially comprises low-pressure pre-needling, medium-pressure positive needling, high-pressure positive needling, high-pressure reverse needling and ultra-high-pressure stabbing; wherein a water pressure of the low-pressure pre-needling is 1-2 MPa, a water pressure of the medium-pressure positive needling is 4-5 MPa, a water pressure of the high-pressure positive needling is 8-10 MPa, a water pressure of the high-pressure reverse needling is 10-15 MPa, and a water pressure of the ultra-high-pressure stabbing is 15-32 MPa.

3. A preparation process of spunlace intertwining type recycled cow leather, comprising a material preparation process, a cow leather fiber web forming process, a mixed fiber web forming process, an overlapped web forming process, a base fabric manufacturing process and a cow leather finished product manufacturing process, which are sequentially performed according to a preparation process flow;

wherein the material preparation process comprises using a mixed fiber and a cow leather fiber as raw materials, and proportioning the same according to weight; and the mixed fiber is a mixed fiber selected from at least two of a regenerated fiber, a chemical fiber and the cow leather fiber;

wherein the cow leather web-forming process comprises preparing the cow leather fiber into a cow leather web by dry-forming or wet-forming;

wherein the mixed fiber web forming process sequentially comprises a carding web forming process, a web lapping process and a spunlace preforming process of the mixed fiber;

wherein the overlapped web forming process comprises overlapping the cow leather fiber web and the mixed fiber web to form an overlapped web, and sequentially performing a spunlace intertwining process, a vacuum absorption-drying process and a circulation drying process the overlapping process;

wherein the base fabric manufacturing process comprises a buffing process, a single-side immersion treatment process and an ironing process which are sequentially performed to transform the overlapped web into the base fabric; the single-side immersion treatment process comprises coating a single side of the base fabric with a water-based PU material or an oil-based PU material by using an inverted feeding device so as to form a single-side permeable immersion layer of the base fabric;

wherein the cow leather finished product manufacturing process comprises a PU film pasting process for forming a front surface of the base fabric, a finishing treatment process for finishing the front surface of the base fabric and an oil return treatment process for a back surface of the base fabric, which are sequentially performed; and wherein the oil return treatment process comprises preparing an oil return liquid, using an inverted feeding device, and performing single-side coating treatment on the back surface of the base fabric by using the oil return liquid as a coating; and a preparation process of the oil return liquid comprises adding 5-10 parts of leather softening oil, 5-10 parts of lanolin, 5-10 parts of penetrant and 0.3-0.5 part of mildew inhibitor into 100 parts of ionic water, and uniformly mixing a mixture to prepare the oil return liquid.

* * * * *